UNITED STATES PATENT OFFICE.

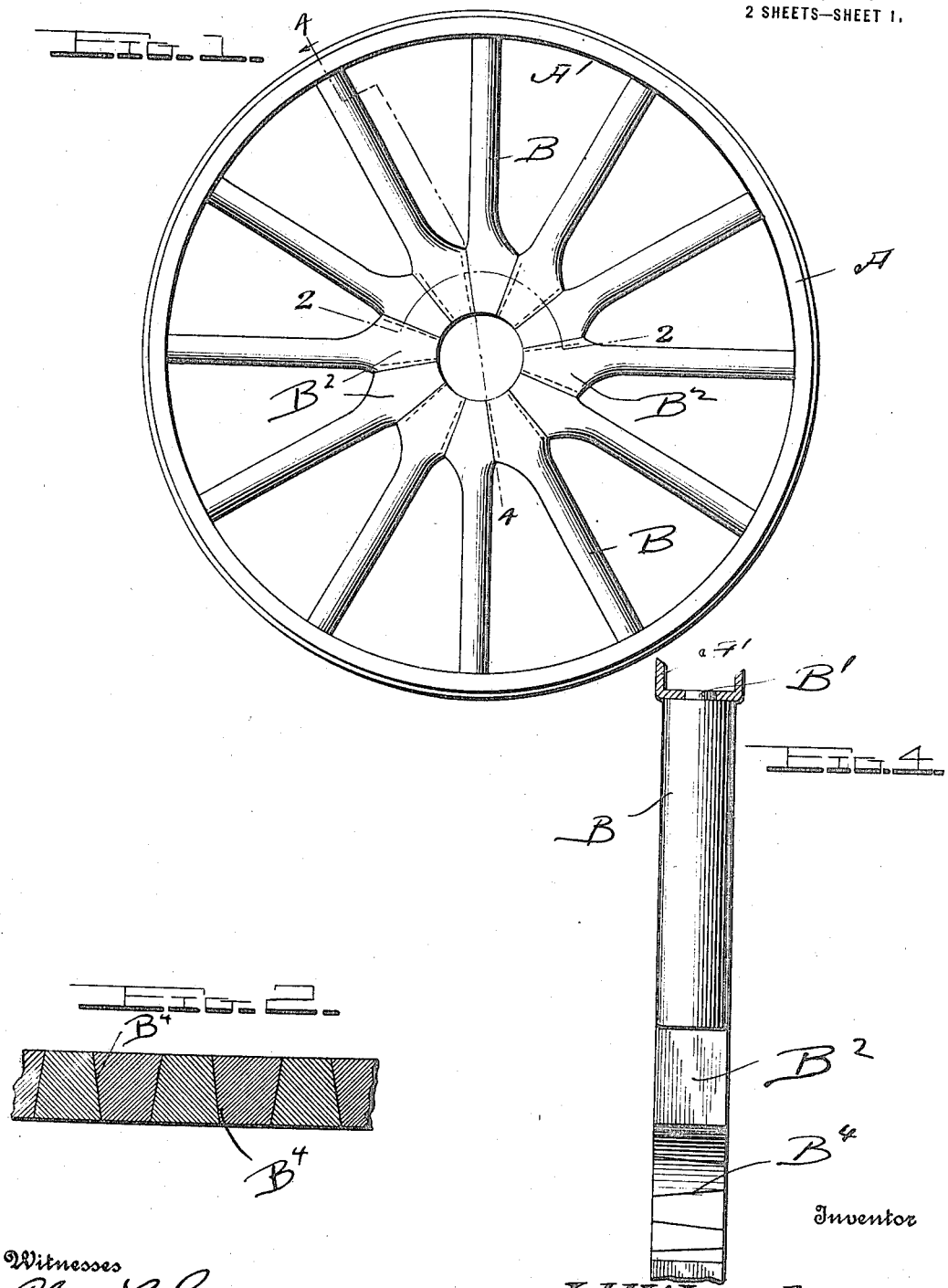

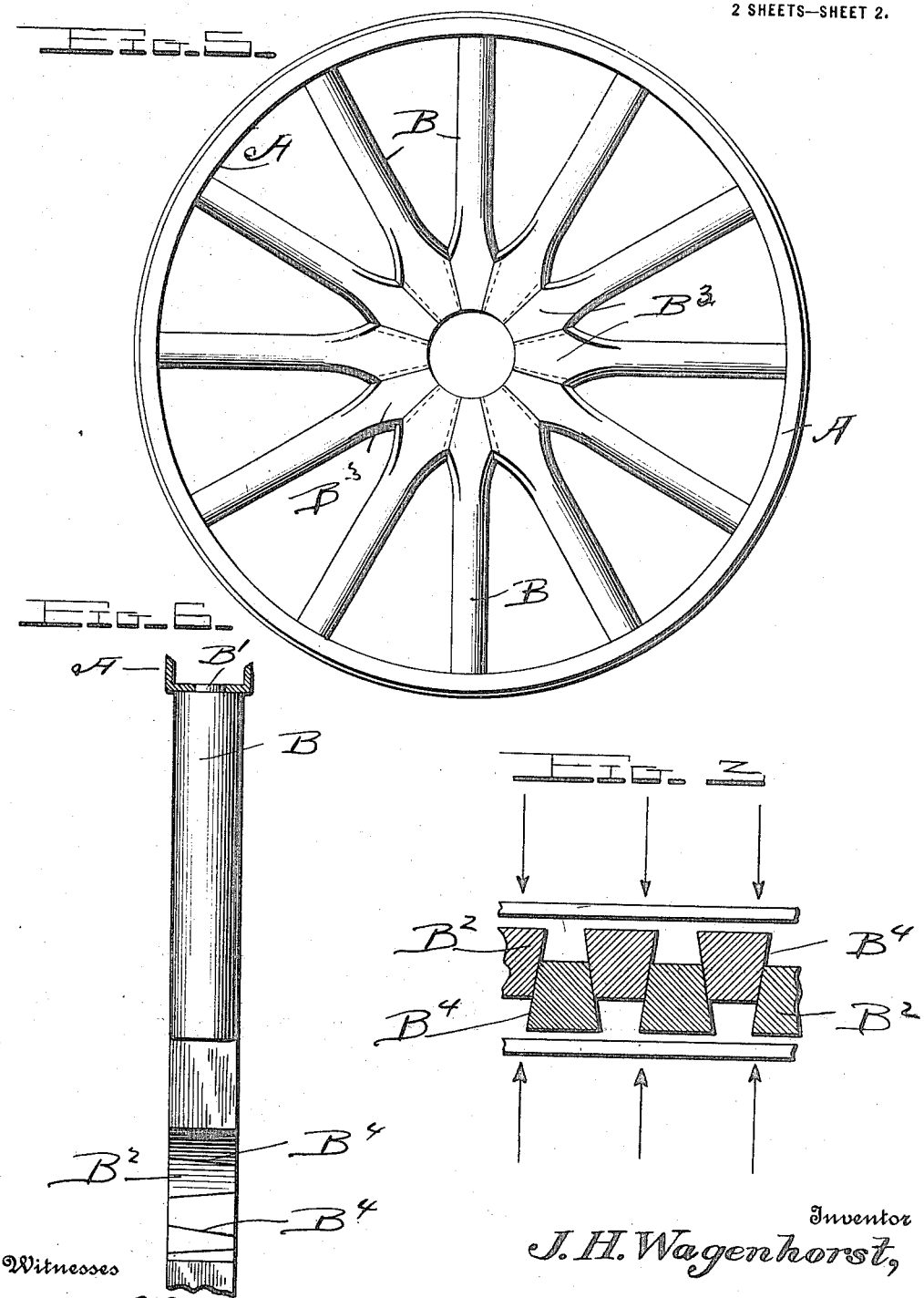

JAMES H. WAGENHORST, OF AKRON, OHIO, ASSIGNOR TO THE B. F. GOODRICH COMPANY, OF NEW YORK, N. Y., A CORPORATION OF NEW YORK.

WHEEL AND METHOD OF MAKING THE SAME.

1,234,428.      Specification of Letters Patent.      Patented July 24, 1917.

Application filed August 23, 1913. Serial No. 786,317.

*To all whom it may concern:*

Be it known that I, JAMES H. WAGENHORST, a citizen of the United States, residing at Akron, in the county of Summit and State of Ohio, have invented a new and useful Improvement in Wheels and Methods of Making the Same, of which the following is a specification.

This invention relates to wheels for vehicles having wooden or other spokes of the compression type and an endless, inextensible felly which may, for example, be of channel-section steel. My objects are to reduce the number of parts and operations connected with the manufacture of these wheels, especially as compared with the prevailing mode of making wheels whose spokes and fellies are both of wood, and to furnish a wheel of greatly increased strength, whose spokes cannot become loose either at the hub or at the felly.

Of the accompanying drawings:

Figure 1 is a side elevation of a wheel constructed according to my invention.

Fig. 2 is a sectional view on the line 2—2 of Fig. 1.

Fig. 3 is a sectional view illustrating the manner of arranging the spokes and also the method of bringing them into their proper final position.

Fig. 4 is a sectional elevation on the line 4—4 of Fig. 1.

Fig. 5 is a side elevation of a slightly-modified form of wheel embodying the same general characteristics.

Fig. 6 is a sectional elevation of this modification, corresponding to Fig. 4.

In the drawings, A is an endless metal felly which may for example be of cold-rolled steel of U section as shown, whose ends are united by brazing or otherwise, this particular felly being of a form to receive a demountable rim for a pneumatic or cushion tire. The spokes B are preferably of wood. While the particular shape and material of the felly, and the kind of rim and tire are not essential, the invention aims especially to meet the exacting requirements of motor-vehicle service, and I prefer the endless metal felly because it is adaptable to the method of assembling and the heavy pressures employed in my process, besides being substantially inextensible, non-shrinkable, and non-compressible under the conditions of manufacture and use. I prefer to make the spokes B of wood because of its compressibility across the grain, its substantial incompressibility and non-shrinkability lengthwise of the grain, and its relatively-high coefficient of friction against an adjoining surface of wood or metal when pressed into close contact therewith, as well as for its well-known qualities of lightness, strength, elasticity, etc.

As shown, the spokes B have tenons B' at their outer ends by which they are stepped in suitable apertures or sockets in the felly A, (that is, interlocked with the felly as to lateral movement in any direction,) but the particular form of this connection may be varied. At their inner ends, in addition to the usual longitudinal taper or wedge-shape when viewed from the side of the wheel as shown at $B^2$ in Fig. 1 and $B^3$ in Fig. 5, the spokes are also tapered or wedge-shaped transversely or in section as represented at $B^4$ in Figs. 2, 3, 4 and 6, alternate spokes being reversely arranged so that the broad face or wedge-end of one is adjacent to the narrow face or wedge-end of its neighbor on each side face of the wheel.

The wedge form, both laterally and longitudinally, of the inner ends of the spokes is most conveniently and effectively imparted by sawing or cutting the spokes themselves to this shape, without building up or separating said ends with extra pieces in a known manner, but it will be understood that I may utilize any suitable means for obtaining substantially the same effect.

I prefer to make each spoke non-symmetrical, or with its stem offset from the middle line of the wedge $B^2$ as indicated in Fig. 1, so that material can be saved by cutting two spokes from one billet, but the shape could be symmetrical as represented in Fig. 5.

In carrying out my invention, the endless felly A is supported in a suitable form and the spokes B are then assembled with the tenons B' on their outer ends stepped in the holes of the felly. The inner ends of the spokes are laterally displaced from their ultimate positions and preferrably staggered or positioned on opposite sides of the middle plane as shown in Fig. 3 (whether it be a geometrical plane or the conical "plane" of a cambered wheel), the tapered sides of wedges B⁴ being overlapped and in contact, after which, by the exertion of heavy lateral prssure against the inner ends from opposite sides as indicated by the arrows in Fig. 3, these ends are brought into circular alinement in the plane of the wheel. The wedging reaction of the inner ends as they slide between each other tends to increase their collective circumference so as to force the spokes radially outward against, and into rigid connection with, the felly, whose resistance, opposing further expansion, causes the lateral pressure to crowd the inner ends so tightly together that the wood is more or less compressed transversely and the contacting wedge faces are firmly interlocked frictionally, the result being a permanent condition of balanced radial and circumferential stresses or pressures supplied and maintained wholly by the wedging reaction. In referring to this resulting condition, I of course do not exclude the employment of auxiliary expedients such as gluing the inner spoke ends or miters before assembling, nor do I exclude the theoretical and actual slight deformation of the felly from the true circular form under the endwise pressure of the spokes, due to the elasticity of the felly, which no doubt contributes to the maintenance of the balanced radial stresses, although it is so small in amount as to be almost imperceptible. In all prior wheels of which I am aware, in which the spokes are wedged together and against a preformed or complete felly, no attempt has been made to jam the spokes at the outset permanently into a receiving space somewhat too small to take them except by placing them under heavy compressive strain, and therefore, and also because of the employment of wooden fellies in most of such instances, the spokes of such wheels have been subject to the necessity of further adjustment or wedging together during use, a requirement which is entirely done away with by my invention. The wheel has unusual strength in all directions, combined with a desirable degree of elasticity, and is immune from any subsequent tendency of the spokes to loosen either at the hub or at the felly.

Finally, the wheel is bored out centrally for the reception of the hub. It is desirable to postpone this operation of trimming the spokes to a uniform length and inserting the hub, until the wheel is formed, for even if the spokes are made initially of equal length, the wedging pressure usually will, owing to unavoidable variations in the texture and transverse compressibility of the wood, cause some of the ends to project inward farther than others.

While I do not claim to be the first to propose a metal-felly, wood-spoke wheel, it is believed that the present invention is the first to provide a practical structure of this class, with all parts permanently jammed or wedged together in the course of manufacture, and the invention is therefore not to be confined to the exact form and procedure shown for giving effect and embodiment to this idea.

I claim:

1. The method of making wheels which consists in assembling an endless and substantially inextensible and incompressible felly together with a set of compression spokes whose collective structure is initially somewhat too large for the receiving space, and expanding the spoke set outwardly against the felly by jamming the spokes together substantially into alinement at their hub portions.

2. The method of making wheels which consists in assembling a set of compression spokes, staggered at their hub ends on opposite sides of the ultimate spoke plane, within an endless, metal felly, and, with lateral pressure exerted from opposite sides, expanding the spoke set outwardly against the felly by jamming the spokes permanently together into alinement at their hub portions.

3. The method of making compression-spoke wheels which consists in assembling within an endless, inextensible felly a series of spokes with their outer ends stepped on the felly, the structure at the inner ends of the spokes presenting wedge portions which project alternately in opposite directions laterally of the spokes, and then bringing said wedge portions into lateral alinement and permanently wedging the spokes outwardly into rigid connection with the felly by lateral pressure exerted in opposite directions on the respective wedge portions.

4. The method of making compression-spoke wheels which consists in assembling within an endless, inextensible, metal felly a series of spokes having their inner ends tapered longitudinally and also tapered laterally in reverse relation in alternate spokes, the outer ends of the spokes being stepped on the felly and their inner ends projecting alternately on opposite sides of the ultimate spoke plane, and then exerting lateral pressure from opposite sides on the inner ends of the alternate spokes to wedge them permanently into alinement at their inner ends and force their outer ends rigidly against the felly.

5. The method of making compression-spoke wheels which consists in assembling within an endless, inextensible felly a series of wooden spokes with their outer ends stepped on the felly and their inner ends longitudinally and transversely wedge-shaped and alternately projecting on opposite sides of the ultimate spoke plane, wedging the inner ends of said spokes into lateral alinement by pressure exerted thereon from opposite sides, and then trimming the inner ends of the spokes concentrically with the wheel axis for the reception of the hub.

6. A vehicle wheel comprising an endless, inextensible felly, and a series of compression spokes having their outer ends rigidly stepped on the felly, the structure at the inner ends of the spokes including reversely-arranged lateral wedges, said inner ends being alined and the spokes permanently held under balanced compressive strains by the wedging reaction at their inner ends.

7. A vehicle wheel comprising an endless, inextensible metal felly, and a series of wooden compression spokes having tenons on their outer ends occupying sockets in the felly, their inner ends being wedge-shaped longitudinally and also reversely wedge-shaped laterally in alternate spokes, said inner ends being alined and the spokes permanently held under balanced compressive strains by the wedging reaction of their inner ends.

8. A vehicle wheel comprising an endless and substantially inextensible and incompressible felly, in combination with a set of compression spokes having their outer ends rigidly stepped on the felly and their hub portions jammed together substantially in the same plane, said spokes being under permanent, balanced, radial compressive strains.

9. A vehicle wheel comprising an endless metal felly, in combination with a set of wooden spokes having their outer ends stepped in sockets on said felly and their hub portions wedged solidly together substantially in alinement, the spokes being thereby permanently stressed against each other and the felly.

JAMES H. WAGENHORST.

Witnesses:
CHAS. E. BROCK,
ELLWOOD O. WAGENHORST.